US012810642B2

(12) United States Patent
Francis

(10) Patent No.: US 12,810,642 B2
(45) Date of Patent: Nov. 24, 2026

(54) INFORMATION PROCESSING APPARATUS FOR EXTRACTING TEXT FRAGMENTS, NON-TRANSITORY COMPUTER READABLE RECORDING MEDIUM THAT RECORDS AN INFORMATION PROCESSING PROGRAM FOR EXTRACTING TEXT FRAGMENTS, AND INFORMATION PROCESSING METHOD OF EXTRACTING TEXT FRAGMENTS

(71) Applicant: KYOCERA DOCUMENT SOLUTIONS INC., Osaka (JP)

(72) Inventor: Elie Francis, Lyons (FR)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 267 days.

(21) Appl. No.: 18/752,806

(22) Filed: Jun. 25, 2024

(65) Prior Publication Data

US 2025/0391192 A1 Dec. 25, 2025

(51) Int. Cl.

| | |
|---|---|
| ***G06V 30/414*** | (2022.01) |
| ***G06V 30/18*** | (2022.01) |
| ***G06V 30/19*** | (2022.01) |
| ***G06V 30/22*** | (2022.01) |
| ***G06V 30/40*** | (2022.01) |
| ***G06V 30/42*** | (2022.01) |

(52) U.S. Cl.

CPC ............ *G06V 30/191* (2022.01); *G06V 30/18* (2022.01); *G06V 30/22* (2022.01); *G06V 30/414* (2022.01); *G06V 30/42* (2022.01); *G06V 2201/10* (2022.01)

(58) Field of Classification Search

None

See application file for complete search history.

(56) References Cited

U.S. PATENT DOCUMENTS

| | | | | |
|---|---|---|---|---|
| 2007/0206884 | A1* | 9/2007 | Kato | G06V 30/262 382/229 |
| 2017/0351915 | A1* | 12/2017 | Thompson | G06V 30/413 |
| 2021/0357633 | A1* | 11/2021 | Bade | G06F 40/284 |
| 2022/0156490 | A1* | 5/2022 | Matiukhov | G06V 10/945 |
| 2022/0309274 | A1 | 9/2022 | Umeda | |
| 2022/0398399 | A1* | 12/2022 | Muffat | G06N 3/0475 |

FOREIGN PATENT DOCUMENTS

| | | | | |
|---|---|---|---|---|
| CN | 115438658 | A * | 12/2022 | G06F 40/205 |
| JP | 2007233913 | A | 9/2007 | |
| JP | 2022149283 | A | 10/2022 | |
| KR | 102572549 | B1 * | 8/2023 | G06V 30/413 |
| KR | 20230174700 | A * | 12/2023 | G06N 3/096 |

* cited by examiner

*Primary Examiner* — Amandeep Saini
*Assistant Examiner* — Caroline Tabancay Duffy
(74) *Attorney, Agent, or Firm* — Li & Cai Intellectual Property Office

(57) ABSTRACT

An information processing apparatus includes: a text fragment detecting unit configured to detect one or more text fragments from a document page, each text fragment being a group of multiple texts; a meta information obtaining unit configured to obtain meta information from the one or more text fragments; and a text fragment extracting unit configured to extract a text fragment from the one or more text fragments based on the meta information.

12 Claims, 4 Drawing Sheets

INFORMATION PROCESSING APPARATUS FOR EXTRACTING TEXT FRAGMENTS, NON-TRANSITORY COMPUTER READABLE RECORDING MEDIUM THAT RECORDS AN INFORMATION PROCESSING PROGRAM FOR EXTRACTING TEXT FRAGMENTS, AND INFORMATION PROCESSING METHOD OF EXTRACTING TEXT FRAGMENTS

FIELD OF THE DISCLOSURE

The present disclosure relates to an information processing apparatus configured to extract a content text fragment from a document page that is a semi-structured document, a non-transitory computer readable recording medium, and an information processing method.

BACKGROUND OF THE DISCLOSURE

There are semi-structured documents such as ledgers, i.e., documents whose formats are predetermined depending on customers and which includes contents with meaning (date, price, model number, etc.). There are many tools in the cloud or on premise to analyze semi-structured document contents in order to extract key information (date, price, model number, etc.). The main goal is to find only useful text fragments, associate them to predefined fields, and ignore all other document contents from semi-structured documents. This kind of processing applies to semi-structured documents.

Most existing tools try to use Deep Learning possibilities relying on a big number of files for each document type. The resulting performances are good, but the drawbacks may be important in some use cases of machine-learning AI.

The related deep learning models are heavy and CPU/GPU time consuming. The related cost is relatively important. In most cases, we need to build new DL models for each new customer on a selection of his own documents. These models are based on supervised data, so the labeling process (done by users) could take hours/days/weeks to be completed, depending on the training dataset size. The model generalization is not easy to achieve. Each document type needs its own models.

SUMMARY OF THE DISCLOSURE

According to an embodiment of the present disclosure, there is provided an information processing apparatus, including: a text fragment detecting unit configured to detect one or more text fragments from a document page, each text fragment being a group of multiple texts; a meta information obtaining unit configured to obtain meta information from the one or more text fragments; and a text fragment extracting unit configured to extract a text fragment from the one or more text fragments based on the meta information.

According to an embodiment of the present disclosure, there is provided a non-transitory computer readable recording medium that records an information processing program that operates a controller circuitry of an information processing apparatus as: a text fragment detecting unit configured to detect one or more text fragments from a document page, each text fragment being a group of multiple texts; a meta information obtaining unit configured to obtain meta information from the one or more text fragments; and a text fragment extracting unit configured to extract a text fragment from the one or more text fragments based on the meta information.

According to an embodiment of the present disclosure, there is provided an information processing method, including: detecting one or more text fragments from a document page, each text fragment being a group of multiple texts; obtaining meta information from the one or more text fragments; and extracting a text fragment from the one or more text fragments based on the meta information.

These and other objects, features and advantages of the present disclosure will become more apparent in light of the following detailed description of best mode embodiments thereof, as illustrated in the accompanying drawings.

DETAILED DESCRIPTION OF THE EXEMPLARY EMBODIMENTS

Hereinafter, an embodiment of the present disclosure will be described with reference to the drawings.

1. Hardware Configuration of Information Processing Apparatus

Figure 1:
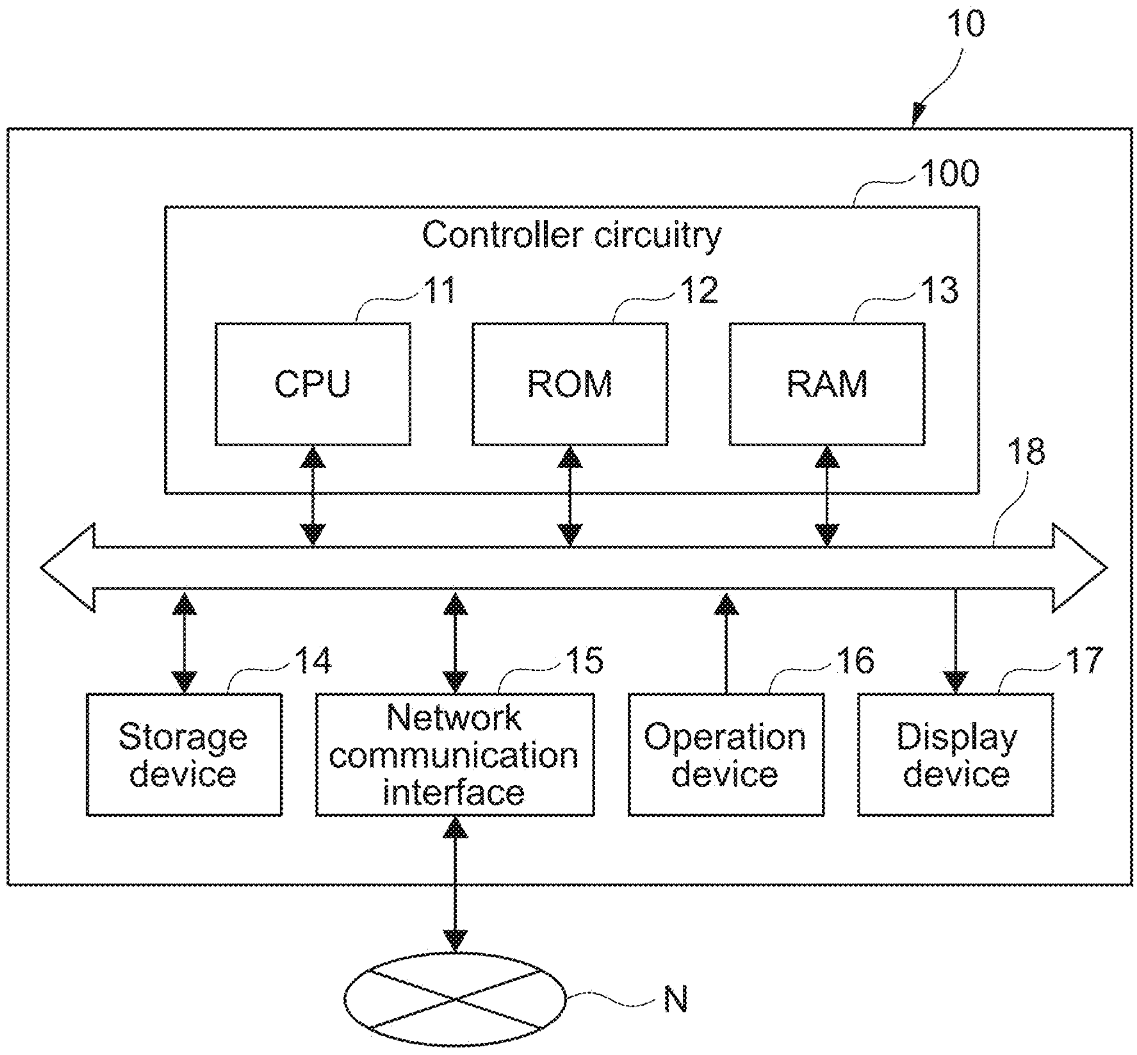
FIG. 1 shows a hardware configuration of an information processing apparatus.

FIG. 1 shows a hardware configuration of an information processing apparatus.

The information processing apparatus 10 includes the CPU 11, the ROM 12, the RAM 13, the storage device 14, which is a large-volume nonvolatile memory such as an HDD or an SSD, the network communication interface 15, the operation device 16, and the display device 17, and the bus 18 connecting them to each other.

The controller circuitry 100 includes the CPU 11, the ROM 12, and the RAM 13. The CPU 11 loads information processing programs stored in the ROM 12 in the RAM 13 and executes the information processing programs. The ROM 12 stores programs executable by the CPU 11, data, and the like nonvolatile. The ROM 12 is an example of a non-transitory computer readable recording medium.

The information processing apparatus 10 may be a personal computer, a server apparatus, an image forming apparatus (for example, MFP, Multifunction Peripheral), and the like.

2. Functional Configuration of Information Processing Apparatus

Figure 2:
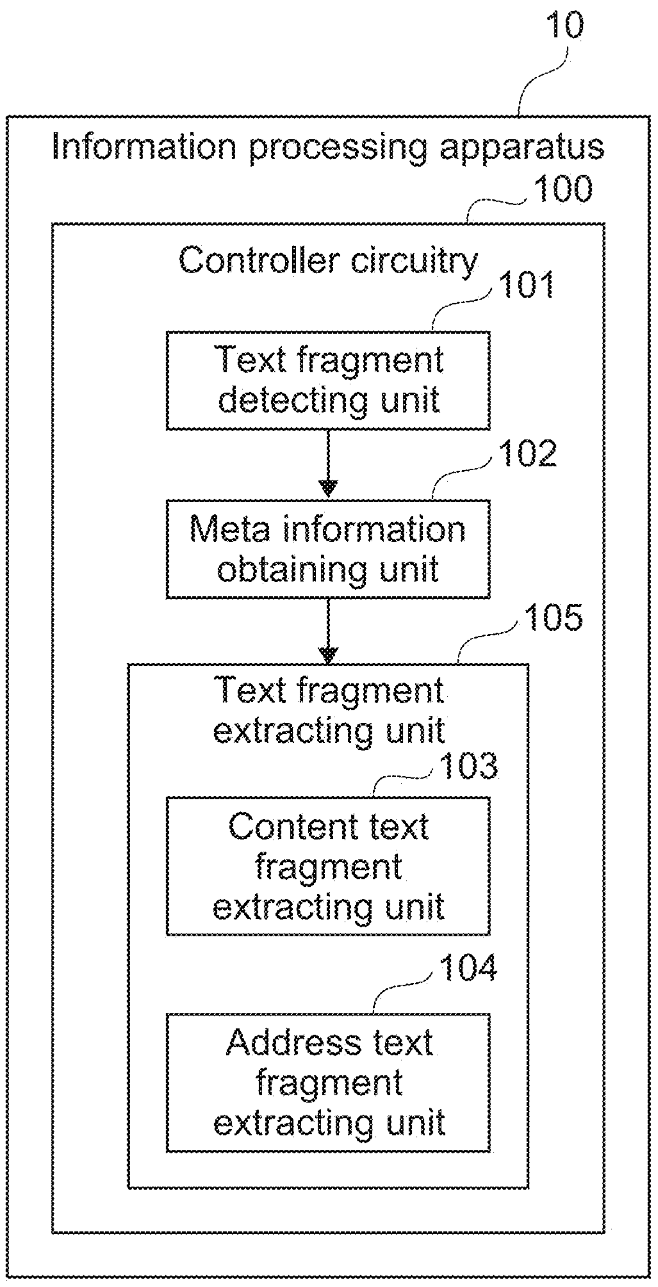
FIG. 2 shows a functional configuration of the information processing apparatus.

FIG. 2 shows a functional configuration of the information processing apparatus.

In the controller circuitry 100 of the image forming apparatus 10, the CPU 11 loads an information processing program stored in the ROM 12 to the RAM 13 and executes the loaded program, thereby operating as the text fragment detecting unit 101, the meta information obtaining unit 102, and the text fragment extracting unit 105. The text fragment extracting unit 105 includes the content text fragment extracting unit 103 and the address text fragment extracting unit 104. The text fragment extracting unit 105 is a rule-based AI. I.e., the content text fragment extracting unit 103 and the address text fragment extracting unit 104 are rule-based AIs.

There is a rule of thumb in AI that recommends using a "rule-based" solution if the conditions are simple to describe and if the resulting model is able to generalize. The content text fragment extracting unit 103 analyzes a semi-structured document based on rules, and converts the semi-structured document into algorithm rule. The rule of the content text fragment extracting unit 103 is based on the human way to analyze a semi-structured document and to transpose it to algorithmic rule.

The main important points regarding the human way to analyze a semi-structured document are as follows. The document is analyzed page by page. Usually, the content that can be ignored is formed by relatively long fragments text. The useful information is presented in the form of Labels/Values. The labels are positioned either on the left side or on the top side of the related values. The labels and values are most of the time near each other. The labels can help the system to find the field names using a configuration files and fuzzy search on most common labels for a field type. Some values have a specific pattern that is easy to detect. (Examples: dates, amounts, alphanumeric codes, etc.) Some characteristics in a page could help us to guess the field name (font style, position, etc.). For example, a bigger font of an amount in an invoice indicates the total value. A first occurrence of an "address" field is most likely the emitter address. Most of times, details are embedded inside tables and are not useful for extraction.

The content text fragment extracting unit 103 is a micro-service that applies rules that utilizes a human way to analyze a semi-structured document on all semi-structured documents.

3. Operational Flow of Information Processing Apparatus

Figure 3:
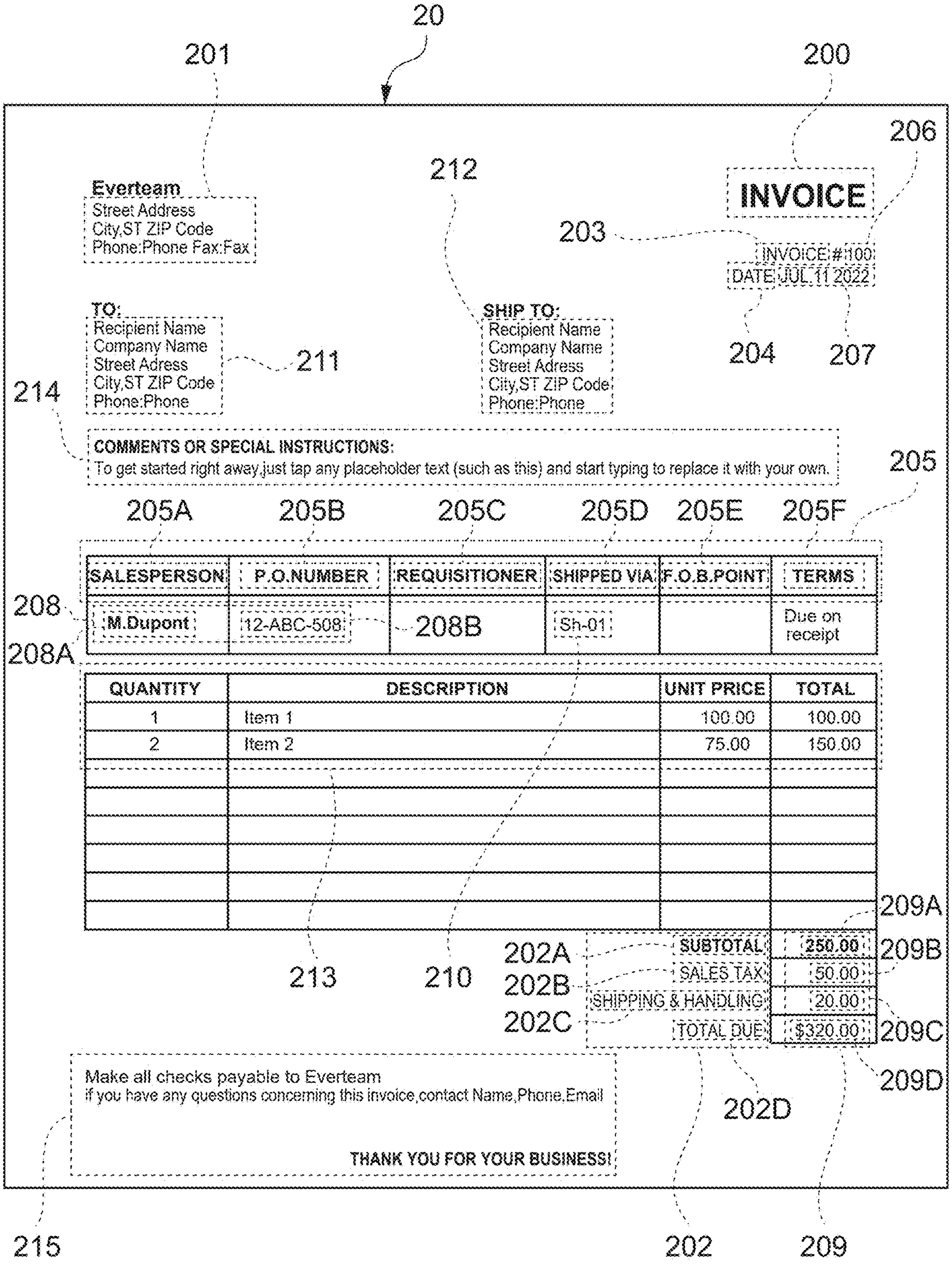
FIG. 3 shows an example of a semi-structured document.
Figure 4:
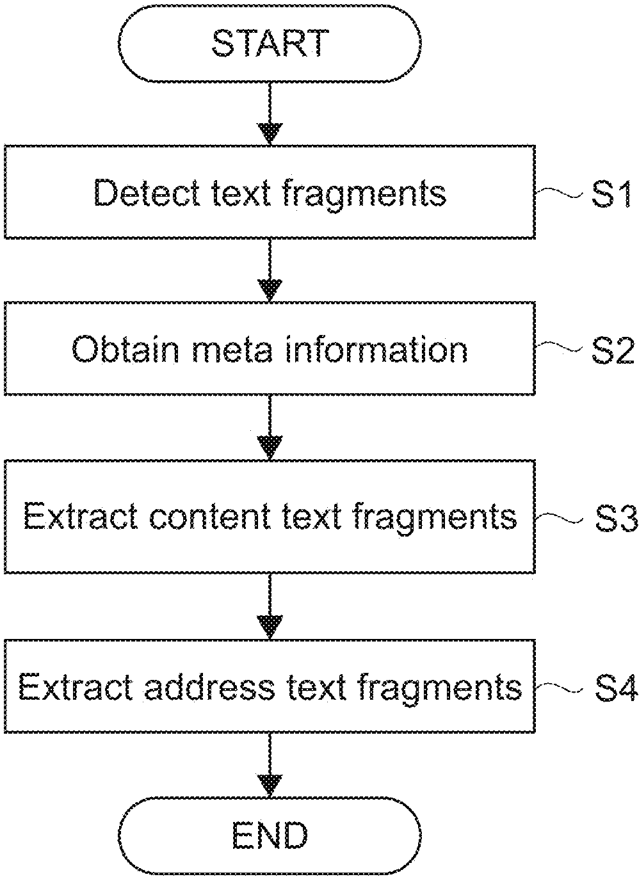
FIG. 4 shows an operational flow of the information processing apparatus.

FIG. 3 shows an example of a semi-structured document. FIG. 4 shows an operational flow of the information processing apparatus.

The text fragment detecting unit 101 obtains the document page 20. The document page 20 is one of semi-structured documents such as ledgers, i.e., documents whose formats are predetermined depending on customers and which includes contents with meaning (date, price, model number, etc.). The document page 20 may be, for example, PDF data, or scan data obtained by scanning paper. The text fragment detecting unit 101 converts the document page 20 into texts. For example, the text fragment detecting unit 101 extracts texts from PDF data or OCRs scan data to thereby convert the document page 20 into texts. The text fragment detecting unit 101 detects one or more (in this example, multiple) text fragments 200-215 from the texts of the document page 20 (Step S1). Each text fragment 200-215 is a group of multiple texts.

The meta information obtaining unit 102 obtains meta information of the detected multiple text fragments 200-215 (Step S2). Meta information includes, for example, the number of characters of the text fragment 200-215 (typically, count value. It may be an approximate value calculated from the area size of a text fragment, the font size, or the like), the position (i.e., XY coordinate position) of the text fragment 200-215 in the document page 20, the font style (i.e., size, boldface, typeface, etc.), the number of lines in the text fragment 200-215, and the like.

The content text fragment extracting unit 103 extracts the content text fragments 206-210 showing contents from the multiple text fragments 200-215 based on the meta information (Step S3). The method will be described more specifically later.

The address text fragment extracting unit 104 extracts the address text fragments 211-212 showing addresses from the multiple text fragments 200-215 based on the meta information (Step S4). The method will be described more specifically later.

4. Rule for Content Text Fragment Extracting Unit

According to the first rule, the content text fragment extracting unit 103 determines that the text fragment 214-215, whose number of characters is larger than a predetermined number (for example, several tens), is not a content text fragment, and does not extract them as content text fragments. A text fragment, whose number of characters is larger than a predetermined number (for example, several tens), is a sentence, and may not likely be a label or a value (date, price, etc.).

According to the second rule, the content text fragment extracting unit 103 determines that the text fragment 201, which is at a predetermined position in the document page 20, is not a content text fragment based on the positions (i.e., XY coordinate position) of the text fragment 200-215 in the document page 20. For example, the text fragment 201 at the top of the document page 20 may likely be emitter information. So the content text fragment extracting unit 103 determines that the text fragment 201 is not a content text fragment, and does not extract it as content text fragment.

According to the third rule, the content text fragment extracting unit 103 determines that the text fragment 200, which includes texts having a predetermined font style (i.e., size, boldface, typeface, etc.), is not a content text fragment. A text fragment having a large font size may be a title or the like, and may not likely be a label or a value (date, price, etc.). Specifically, the content text fragment extracting unit 103 determines that the text fragment 200 having a large font size is not a content text fragment, and does not extract it as content text fragment.

According to the fourth rule, the content text fragment extracting unit 103 determines that the text fragment 213, which is in a table in the document page 20, is not a content text fragment, and does not extract it as content text fragment. Note that an example of a method of extracting the text fragments 205, 208, 209, and 210 as content text fragments and not determining the text fragment 213 in the table as a content text fragment is as follows. For example, the content text fragment extracting unit 103 may determine that the text fragment 213 in a table having a predetermined number of columns or more is not a content text fragment. With regard to a table having a predetermined number of columns or more, features such as character size or boldface of texts in a table may be detected, and part having such features may be extracted as content text fragments. For example, in the text fragment 213, "QUANTITY", "DESCRIPTION", "UNIT PRICE", and "TOTAL" have boldface different from the other typeface, and they may be extracted as content text fragment.

According to the fifth rule, the content text fragment extracting unit 103 determines the label text fragments 202-205 from the text fragments 200-215. The label text fragments 202-205 are text fragments showing labels. A label shows a category (attribute) of a value as a content such as the INVOICE (#) 203 or the DATE 204. With regard to the label text fragment 202, "SUBTOTAL, SALES TAX, SHIPPING & HANDLING, TOTAL DUE" may be extracted as a single label text fragment 202. Alternatively, in the label text fragment group 202, "SUBTOTAL" 202A, "SALES TAX" 202B, "SHIPPING & HANDLING" 202C, and "TOTAL DUE" 202D may be extracted as four separated label text fragment. In the label text fragment group 205, "SALESPERSON, P.O.NUMBER, REQUISITIONER, SHIPPED VIA, F.O.B.POINT, TERMS" may be extracted as a single label text fragment 205. Alternatively, "SALESPERSON" 205A, "P.O.NUMBER" 205B, "REQUISITIONER" 205C, "SHIPPED VIA" 205D, "F.O.B.POINT" 205E, and "TERMS" 205F may be extracted as six separated label text fragment.

The content text fragment extracting unit 103 determines the label text fragment 202-205 based on the positions (i.e., XY coordinate positions) of the text fragments 200-215 in the document page 20. In other words, the content text fragment extracting unit 103 determines the label text fragments 202-205 based on position relationships of the text fragments 200-215. Specifically, the content text fragment extracting unit 103 determines the text fragments 202-205 either at the left side or the top side of other text fragments 206-209 as label text fragments, and does not extract as content text fragments. The content text fragment extracting unit 103 extracts, as content text fragment 206-209, the text fragments 206-209 at predetermined positions with respect to the label text fragments 202-205 (in this example, right side or bottom side).

Note that, where text fragments are both at the left side and the top side of a single text fragment, the content text fragment extracting unit 103 may determine that two label text fragments are on the single text fragment. Alternatively, the content text fragment extracting unit 103 may, where multiple text fragments are at multiple predetermined positions with respect to a single text fragment, based on distances between the single text fragment and the multiple text fragments, or based on sizes of the multiple text fragments, determine, as a label text fragment, one text fragment of the multiple text fragments, and extract, as a content text fragment, another text fragment.

As an example, the character size of the text fragment at the left side may be compared against the character size of the text fragment at the top side, and determine one of the text fragments having the larger character size as a label text fragment. As another example, the distance between a single text fragment and the text fragment at the left side may be compared against the distance between the single text fragment and the text fragment at the top side, and determine one of the text fragments having the smaller distance as a label text fragment.

Further, with regard to the position relationship (XY coordinate direction) of multiple text fragments, where a predetermined number (for example, three) of text fragments are arrayed in one of the X axis direction and the Y axis direction, the content text fragment extracting unit 103 determines that they are not label text fragments, and does not extract them as content text fragments. For example, the first text fragment group 202 includes four text fragments 202A-202D. The second text fragment group 209 includes four text fragments 209A-209D. In this case, a predetermined number or more of (four) text fragments 202A-202D are arrayed in the Y axis direction (vertical direction). So with respect to the position relationship of the text fragments 202A-202D, they are not label text fragments. Meanwhile, with respect to the position relationship in the X axis direction (horizontal direction) that crosses the Y axis direction (vertical direction), a pair text fragments, which includes each of the text fragments 202A-202D and each of the text fragments 209A-209D, are arrayed side by side in a pair (two), the number being smaller than the predetermined number. The text fragments 202A-202D are at the left side of the text fragment 209A-209D, respectively. In this case, based on the position relationship of the pair of each text fragment 202A-202D and each text fragment 209A-209D, the content text fragment extracting unit 103 determines one of the pair of text fragments arrayed side by side as a label text fragment, and determines the other as a content text fragment. Specifically, the content text fragment extracting unit 103 determines the text fragment 202A-202D at the left side, which is one of the pair of text fragments arrayed side by side, as a label text fragment, and does not extract it as a content text fragment. The content text fragment extracting unit 103 extracts, as a content text fragment, the text fragment 209A-209D at the right side, which is the other text fragment of the pair of text fragments arrayed side by side. In this example, the content text fragment extracting unit 103 determines, label text fragments, the text fragments 202A-202D at the left side of the text fragments 209A-209D.

The content text fragment extracting unit 103 selects, as the label text fragments, the text fragments 202-205 nearest to the text fragments 200-215 unless the text fragments are part of a table column. The computed distance between a left side label and a value is affected by the font size. So, if a label has a relatively bigger font, it is probable to be the label of an important value. So the computed distance is shorter than the real one in order to give it more chance to be selected as a label. Such a rule may be made.

Based on the first to fifth rules, the content text fragment extracting unit 103 finally extracts the content text fragments 206-209. Note that any combination of the first to fifth rules may be employed as necessary.

The method of the content text fragment extracting unit 103 has most important benefits as follows.

The rules model is built by generalizing a big number of use cases. The model customization is done through some configuration files. So it takes hours rather than weeks to use a model for a new customer. They contain some options, regex patterns and document types configuration for expected fields. I.e., the content text fragment extracting unit 103 may be customized depending on a regex and/or a document type of an expected field. These options can be set by the administrator before ingesting documents. If the information extraction is not satisfactory, the configuration can be changed and the extraction played again. The processing time of the content text fragment extracting unit 103, which is a rule-based AI, is faster that deep learning models (between 10 and 20 ms/page on a laptop). The rule-based model could rely on simple and fast Image Deep Learning for detecting some parts of the document (tables, addresses, etc.).

5. Rule for Address Text Fragment Extracting Unit

As a part of key information extraction, the detection and recognition of addresses requires specific processing. Usually, addresses are on multiple lines (between 3 and 6 or 7 lines), they are left or right aligned, and some parts respect a given pattern, i.e., predetermined-type address format (in the order of street name, city name, postal code, etc.).

The model of the content text fragment extracting unit 103 may not apply directly to address detection. So the address text fragment extracting unit 104 executes a rule-based model, and for CPU efficiency, tries to detect address text fragments without using Deep Learning models.

The address usually contains multiples fragments on different lines. When the text is to be extracted from a PDF file, the characters are read from left to right, line by line. If a page section contains only one address using 4 lines, the model of the content text fragment extracting unit 103 could work with multiline regex. But most of times there are other text fragments on the same line as a street name for example.

So, instead of using regex in order to detect address parts one by one, then gather them according to vertical positions, the address text fragment extracting unit 104 uses a more convenient solution that uses a popular clustering algorithm: DB Scan (Density Based Scan). In our case, this algorithm is better than K Means (which is the most popular one) because there is no information in advance that the number of clusters to compute.

In order to detect only addresses, the address text fragment extracting unit 104 uses the following criteria. Only clusters having between 3 and 7 text fragments are detected. Each text fragment has a maximum number of characters, e.g., 50 characters. Use the fragment position information (XY coordinates) to find near position fragments allowing the system to detect left or right aligned address parts. Concatenate the address fragments into one string. Apply a regex on the concatenated text to see if it is a predetermined-type address format (e.g., a US address. Any other address type can be configured) or any other type of text.

According to this rule, the address text fragment extracting unit 104 detects the text fragment 211-212, whose number of lines is within a predetermined range (three to seven lines), whose number of characters equal to or smaller than a predetermined number (fifty), and which is at a predetermined position (at the left or right) in the document page 20. The address text fragment extracting unit 104 concatenates, into one string, the texts in the text fragment 211-212 in background. They are concatenated into one string in order to apply a regex. The address text fragment extracting unit 104 applies a regex on the concatenated string, and extracts, as address text fragments, the text fragment 211-212 having the predetermined-type address format.

6. Conclusion

According to US 2007/0206884 A1 (Japanese patent application laid-open No. 2007-233913), an image processing apparatus includes a character recognition section that executes character recognition on an input document image and outputs a character recognition result, an item name extraction section that extracts a character string relevant to an item name of an information item from the character recognition result, an item value extraction section that extracts a character string of an item value corresponding to the item name from the vicinity of the character string relevant to the item name in the document image, and an extraction information creation section that creates extraction information by associating the character string of the item value extracted by the item value extraction section to the item name. The entire document is OCRed, and a text string that matches a prestored extraction item is extracted. Further a position relationship between an item name and a text string is also prestored.

According to US 2022/0309274 A1 (Japanese patent application laid-open No. 2022-149283), an information processing apparatus includes a processor configured to receive an input of a value of an item of an attribute from a user, the attribute being to be assigned to a form shown by an acquired first image, specify a region in which the value of the item is shown in the first image, generate a rule for extracting the value of the item by using at least one of an element at a predetermined distance from the specified region or coordinates of the region in the first image, and extract the value of the item from a form shown by an acquired second image by using the rule.

According to US 2007/0206884 A1 (Japanese patent application laid-open No. 2007-233913), the rule (extraction item information) for extracting an item value corresponding to an item name should include an item name. In addition, it should be prestored in association with the item name.

To the contrary, according to the present disclosure, the rule-based AI is capable of extracting item values without presetting items.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
- a text fragment detecting unit configured to detect one or more text fragments from a document page that is a semi-structured document, each text fragment being a group of multiple texts;
- a meta information obtaining unit configured to obtain meta information from the one or more text fragments; and
- a text fragment extracting unit configured to extract a text fragment from the one or more text fragments based on the meta information, wherein
- the meta information includes a number of lines in the text fragment, a number of characters in the text fragment, and an XY coordinate being a position of the text fragment in the document page,
- the text fragment extracting unit includes an address text fragment extracting unit and a content text fragment extracting unit,
- the address text fragment extracting unit is configured to
  - detect a cluster having near-position text fragments, whose number of lines is within a predetermined range, whose number of characters equal to or smaller than a predetermined number, and being left or right aligned according to the XY coordinates, which is not at a top of the document page,
  - concatenate the text fragments in the cluster into one string,
  - apply a regex on the concatenated string, and
  - extract, as an address text fragment showing an address, the concatenated string having a predetermined-type address format, and
- the content text fragment extracting unit is configured to
  - extract a content text fragment from the one or more text fragments based on the meta information, the content text fragment being a text fragment showing a content, and
  - determine that a cluster having text fragments, which is at the top of the document page, is not a content text fragment but an emitter information even if the cluster has the predetermined-type address format, and determine not to extract the cluster.

2. The information processing apparatus according to claim 1, wherein the meta information includes a position of the text fragment in the document page, and the content text fragment extracting unit is configured to determine a label text fragment, the label text fragment being a text fragment showing a label, and extract, as a content text fragment, the text fragment at a predetermined position with respect to the label text fragment.

3. The information processing apparatus according to claim 2, wherein the content text fragment extracting unit is configured to, where multiple text fragments are at multiple predetermined positions with respect to a single text fragment, based on distances between the single text fragment and the multiple text fragments, or based on sizes of the multiple text fragments, determine, as a label text fragment, one text fragment of the multiple text fragments, and extract, as a content text fragment, another text fragment.

4. The information processing apparatus according to claim 2, wherein the content text fragment extracting unit is configured to, where a first text fragment group includes multiple text fragments of a predetermined number or more arrayed in one direction, a second text fragment group includes multiple text fragments of the predetermined number or more arrayed in the one direction, a pair text fragments, which includes each of the multiple text fragments in the first text fragment group and each of the multiple text fragments in the second text fragment group, are arrayed in a direction that crosses the one direction, and a number of the pairs of the multiple text fragments arrayed is smaller than the predetermined number, determine, as a label text fragment, one text fragment of the pair of text fragments based on a position relationship of the pair, and extract, as a content text fragment, another text fragment.

5. The information processing apparatus according to claim 1, wherein the meta information includes a number of characters in the text fragment, and the content text fragment extracting unit is configured to determine that a text fragment, whose number of characters is larger than a predetermined number, is not a content text fragment.

6. The information processing apparatus according to claim 1, wherein the meta information includes a font style, and the content text fragment extracting unit is configured to determine that a text fragment, which includes texts having a predetermined font style, is not a content text fragment.

7. The information processing apparatus according to claim 1, wherein the meta information includes a position of the text fragment in the document page, and the content text fragment extracting unit is configured to determine that a text fragment, which is in a table in the document page, is not a content text fragment.

8. The information processing apparatus according to claim 1, wherein the cluster detected by the text fragment extracting unit has three to seven lines and a maximum number of fifty characters.

9. The information processing apparatus according to claim 1, wherein the text fragment extracting unit is a rule-based artificial intelligence (AI).

10. The information processing apparatus according to claim 1, wherein the content text fragment extracting unit is customized depending on a regex and/or a document type of an expected field.

11. A non-transitory computer readable recording medium that records an information processing program that operates a controller circuitry of an information processing apparatus as:

a text fragment detecting unit configured to detect one or more text fragments from a document page that is a semi-structured document, each text fragment being a group of multiple texts;

a meta information obtaining unit configured to obtain meta information from the one or more text fragments; and a text fragment extracting unit configured to extract a text fragment from the one or more text fragments based on the meta information, wherein the meta information includes a number of lines in the text fragment, a number of characters in the text fragment, and an XY coordinate being a position of the text fragment in the document page, the text fragment extracting unit includes an address text fragment extracting unit and a content text fragment extracting unit, the address text fragment extracting unit is configured to detect a cluster having near-position text fragments of three to seven lines each having a maximum number of fifty characters and being left or right aligned according to the XY coordinates, which is not at a top of the document page, concatenate the text fragments in the cluster into one string, apply a regex on the concatenated string, and extract, as an address text fragment showing an address, the concatenated string having a predetermined-type address format, and the content text fragment extracting unit is configured to extract a content text fragment from the one or more text fragments based on the meta information, the content text fragment being a text fragment showing a content, and determine that a cluster having text fragments, which is at the top of the document page, is not a content text fragment but an emitter information even if the cluster has the predetermined-type address format, and determine not to extract the cluster.

12. An information processing method, comprising:

detecting one or more text fragments from a document page that is a semi-structured document, each text fragment being a group of multiple texts;

obtaining meta information from the one or more text fragments; and extracting a text fragment from the one or more text fragments based on the meta information, wherein the meta information includes a number of lines in the text fragment, a number of characters in the text fragment, and an XY coordinate being a position of the text fragment in the document page, the extracting step includes an address text fragment extracting step and a content text fragment extracting step, the address text fragment extracting step includes detecting a cluster having near-position text fragments of three to seven lines each having a maximum number of fifty characters and being left or right aligned according to the XY coordinates, which is not at a top of the document page, concatenating the text fragments in the cluster into one string, applying a regex on the concatenated string, and extracting, as an address text fragment showing an address, the concatenated string having a predetermined-type address format, and the content text fragment extracting step includes extracting a content text fragment from the one or more text fragments based on the meta information, the content text fragment being a text fragment showing a content, and determining that a cluster having text fragments, which is at the top of the document page, is not a content text fragment but an emitter information even if the cluster has the predetermined-type address format, and determining not to extract the cluster.

* * * * *